April 15, 1941.    F. CONKLIN    2,238,411
COMBINATION SHOCK ABSORBER AND EXTENSION LEG
Filed June 28, 1939    4 Sheets-Sheet 2
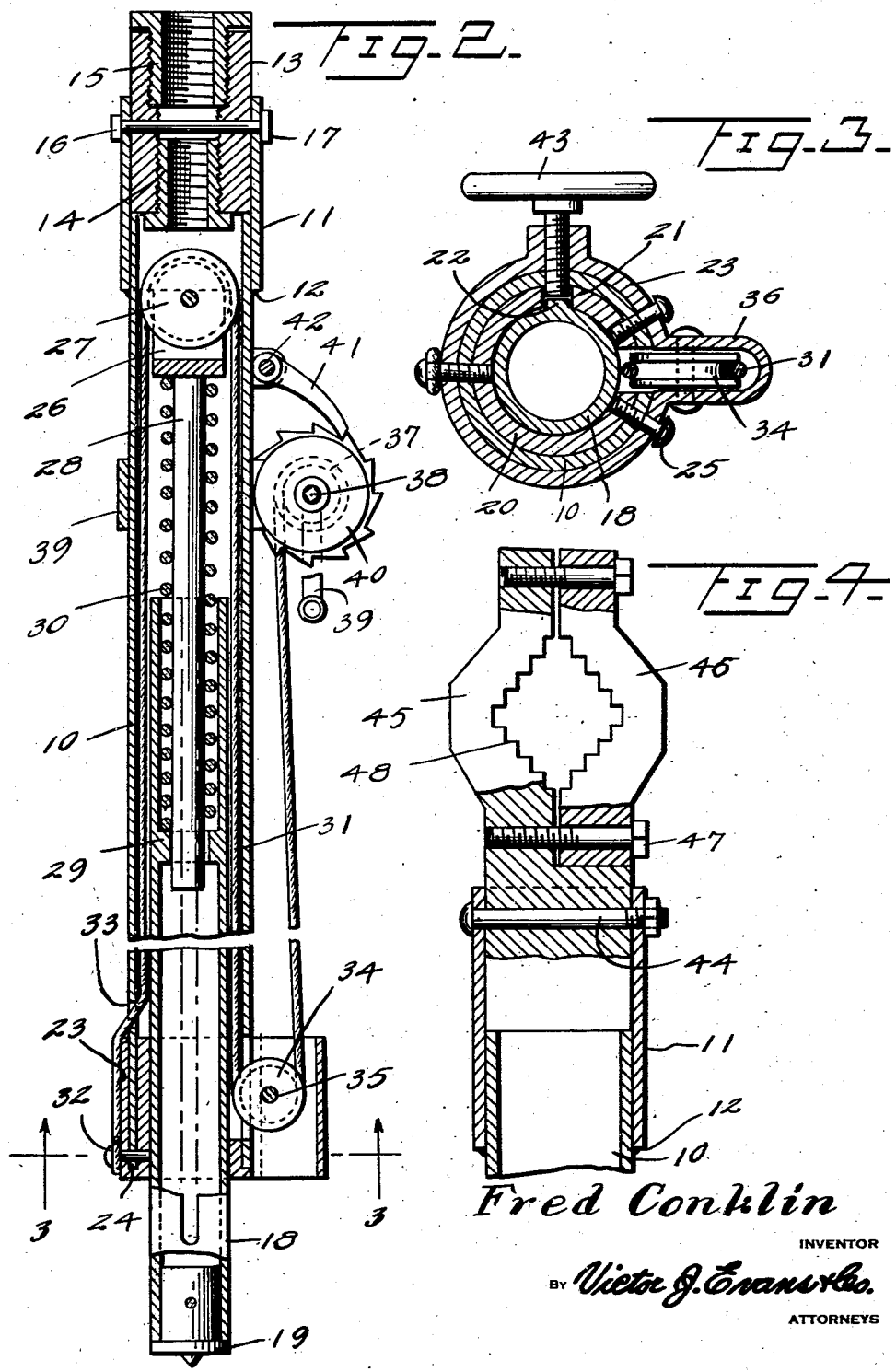
Fred Conklin
INVENTOR
BY Victor J. Evans & Co.
ATTORNEYS

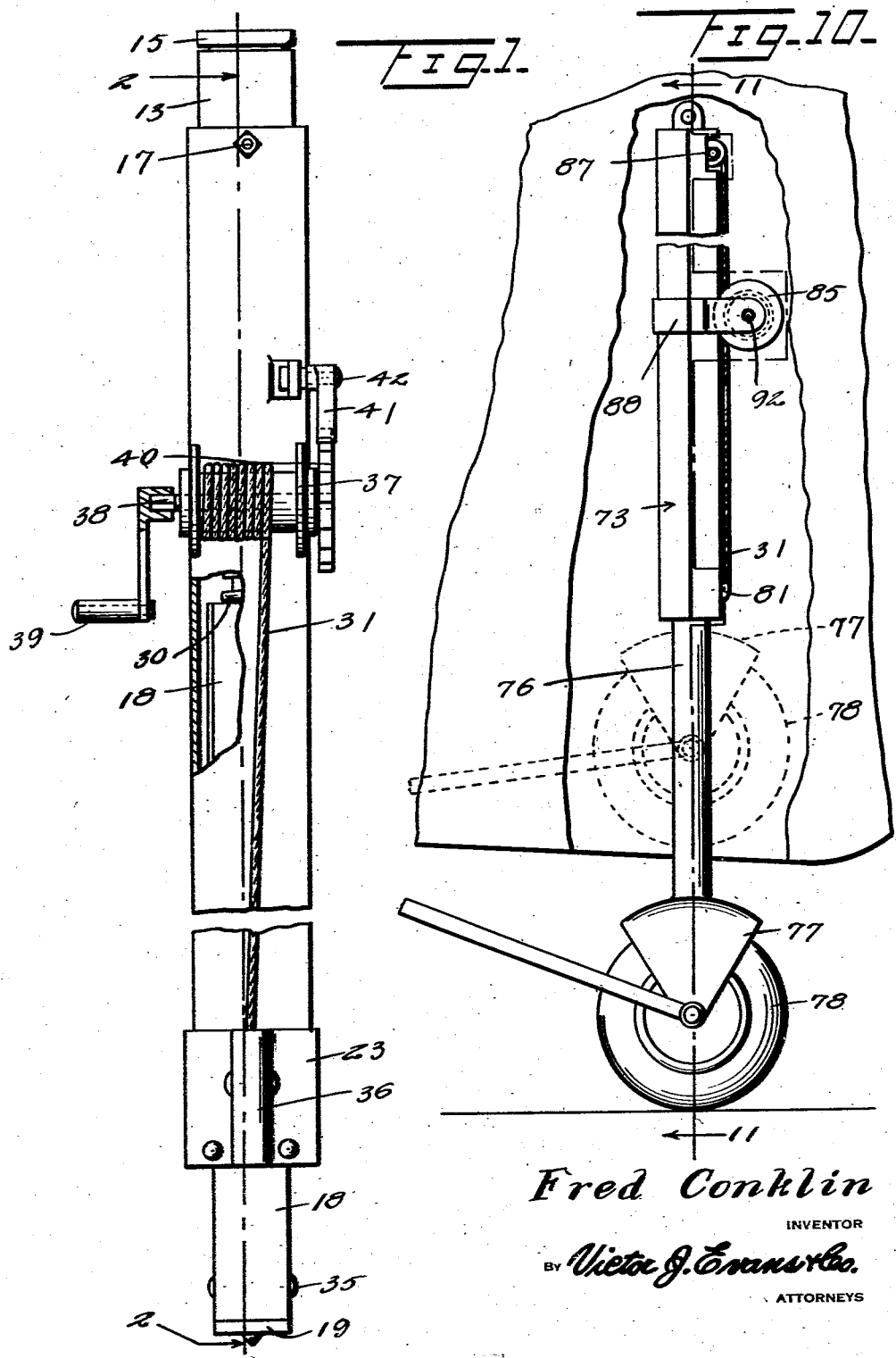

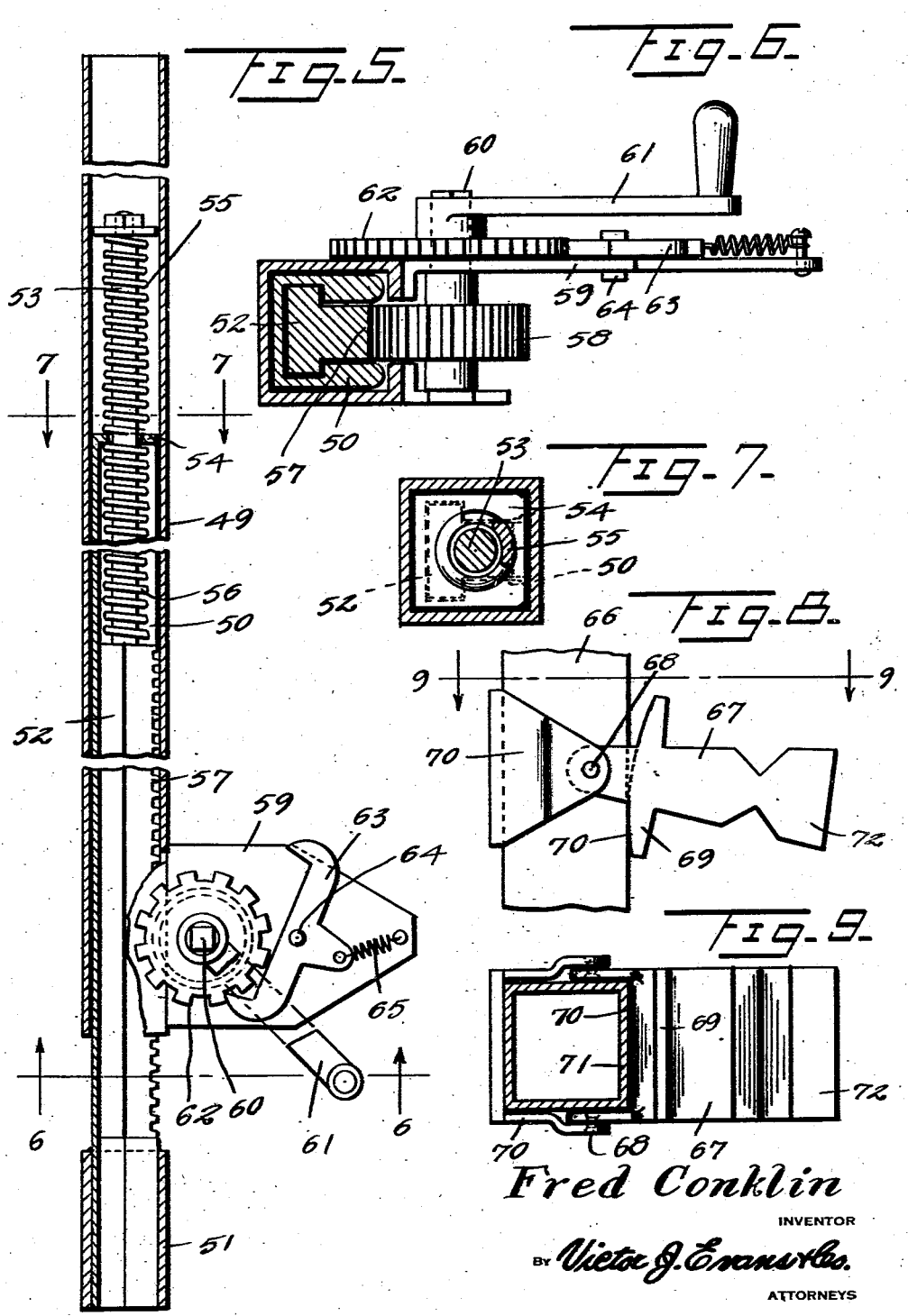

April 15, 1941.  F. CONKLIN  2,238,411
COMBINATION SHOCK ABSORBER AND EXTENSION LEG
Filed June 28, 1939   4 Sheets-Sheet 4
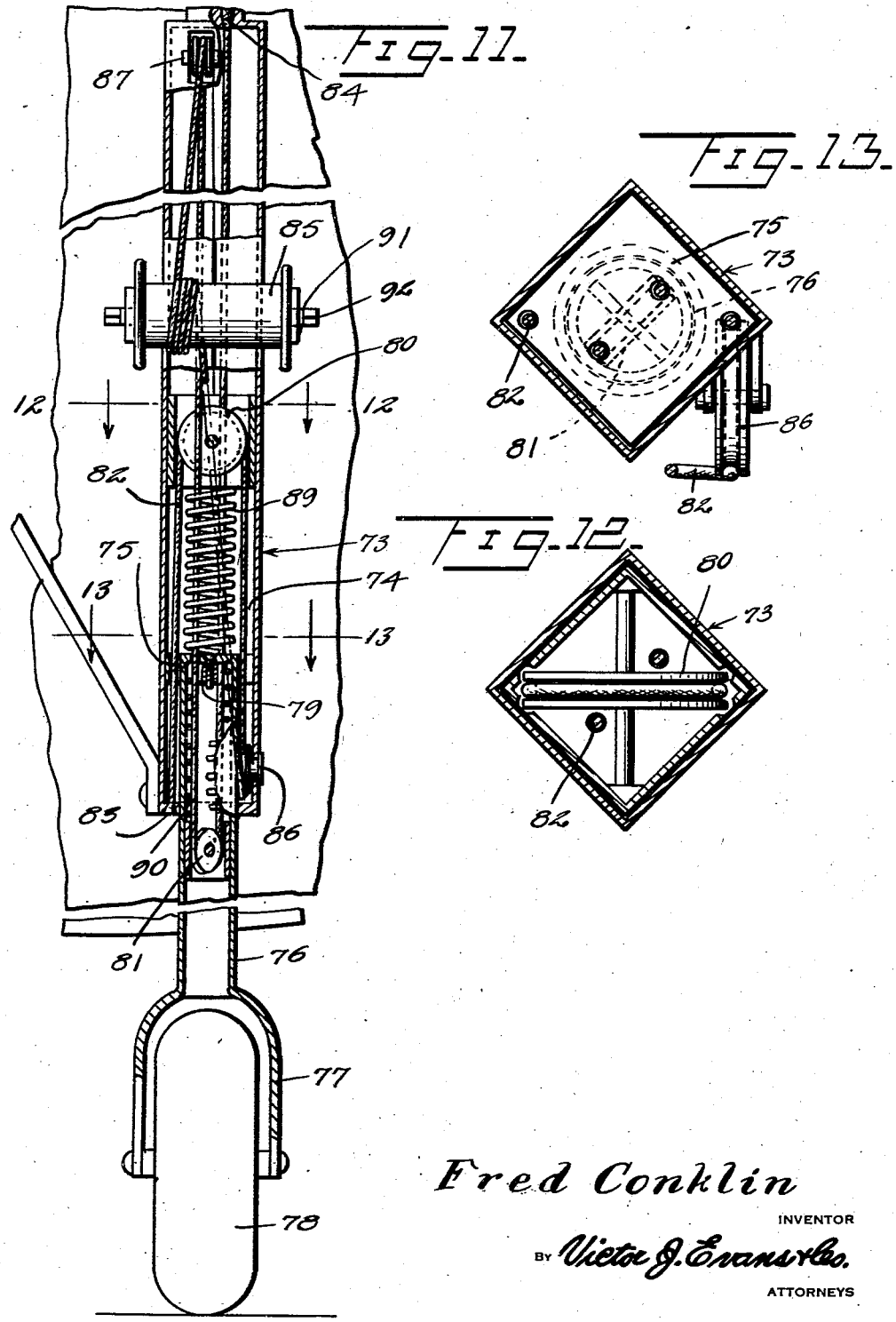
Fred Conklin
INVENTOR
BY Victor J. Evans & Co.
ATTORNEYS Patented Apr. 15, 1941

2,238,411

UNITED STATES PATENT OFFICE 2,238,411

COMBINATION SHOCK ABSORBER AND EXTENSION LEG

Fred Conklin, Los Angeles, Calif.

Application June 28, 1939, Serial No. 281,757

3 Claims. (Cl. 254—148)

The invention relates to a leg construction and more especially to a combination shock absorber and extension leg.

The primary object of the invention is the provision of a device of this character wherein the same can be used in connection with landing gear of aircraft, drilling machines, or for any other purposes requiring a support, and is suceptible of being extended, this being necessary in its use with landing gear or with a drilling machine for the extending or contracting of the landing gear and for the holding of the drilling machine to the work, the device being susceptible of absorbing shocks and jars incident to the use thereof.

Another object of the invention is the provision of a device of this character wherein the construction thereof is novel in its entirety and is susceptible for a variety of uses, as for example, in holding various parts of an assembly in position while being fabricated and is susceptible of assuming any required position and in position will absorb any shocks or jars incident to its use, the device being especially adaptable for service with drilling machines when operating the same overhead to maintain the machine in working position.

A further object of the invention is the provision of a device of this character which is simple in its construction, thoroughly reliable and efficient in operation, readily and easily adjusted for the extending or contracting thereof, assuring a shock absorbing support for work, strong, durable and inexpensive to manufacture.

With these and other objects in view, the invention consists in the features of construction, combination and arrangement of parts as will be hereinafter more fully described in detail, illustrated in the accompanying drawings, which disclose the preferred and modified forms of the embodiment of the invention and pointed out in the claims hereunto appended.

In the accompanying drawings:

Figure 1 is an elevation partly in section of a leg constructed in accordance with the invention.

Figure 2 is a sectional view taken on the line 2—2 of Figure 1 looking in the direction of the arrows.

Figure 3 is a sectional view on the line 3—3 of Figure 2 looking in the direction of the arrows.

Figure 4 is a fragmentary side elevation partly in section, showing a modified form of coupling clamp for the leg.

Figure 5 is a view similar to Figure 2 showing a modified form of leg.

Figure 6 is an enlarged transverse sectional view taken on the line 6—6 of Figure 5 looking in the direction of the arrows.

Figure 7 is a sectional view on the line 7—7 of Figure 5 looking in the direction of the arrows.

Figure 8 is a fragmentary side elevation showing a friction clamp for use with the leg.

Figure 9 is a sectional view taken on the line 9—9 of Figure 8 looking in the direction of the arrows.

Figure 10 is a side elevation of a further modification of the invention, showing the use thereof in association with landing gear for aircraft.

Figure 11 is a sectional view taken on the line 11—11 of Figure 10 looking in the direction of the arrows.

Figure 12 is a sectional view on the line 12—12 of Figure 11 looking in the direction of the arrows.

Figure 13 is a sectional view taken on the line 13—13 of Figure 11 looking in the direction of the arrows.

Similar reference characters indicate corresponding parts throughout the several views in the drawings.

Referring to the drawings in detail, particularly Figures 1 to 3 inclusive, the leg construction therein illustrated comprises an outer upper tubular section 10 having welded or otherwise united thereto at its upper end an encircling coupling sleeve 11, the weld thereof being indicated at 12 and accommodated within this sleeve 11 for abutting the uppermost end of the section 10 is a coupling collar 13 having removably threaded therein through opposite ends the inner and outer bushings 14 and 15 respectively, the collar being removably joined with the sleeve 11 into which it fits by means of a cross bolt 16 carrying a nut 17 and these bushings 14 and 15 each functions for the joining of the collar 13 with a drilling machine, not shown, the collar 13 being reversible for the adaptability of either bushing 14 or 15 in the joining of the collar 13 to said drill so that the latter will be supported by the leg further described hereinafter.

Telescopically fitted within the section 10 through the lower open end thereof is the extensible section 18 in the lowermost end of which is fixed a spurred foot 19 and this section 18 is slidably keyed or splined to a guide ring formation 20, the keyway therein being indicated at 21 and the key or spline at 22 respectively, the latter being formed on the extensible section 18 and this formation 20 is a part of an external fitting 23 interfitted with the lowermost end of the section 10. This lowermost end 24 of the section 10 is accommodated within the fitting 23 and is detachably fixed therein by holding screws 25 which are passed through the fitting and engaged in the section 10 as is clearly shown in Figure 3 of the drawings.

Within the section 10 between the innermost end of the section 18 and the collar 13 is a spring supported yoke 26 to which is journaled a pulley 27 and has formed therewith a stem 28 which is slidably telescoped into the upper innermost end of the section 18, the latter having therein the rest shoulder 29 for the coiled compression spring 30 which surrounds the stem 28 and yieldably supports the said yoke 26 having the pulley 27 journaled therein. Over this pulley is trained a cable 31 which has the outer end 32 thereof fixed to one of the screws 25 being trained exteriorly of the section 10 through a clearance 33 therein. The cable 31 is also trained over a pulley 34 journaled at 35 in an outstruck portion 36 of the fitting 23 and has its inner end connected to a windlass 37, its axle 38 being journaled in a bracket 39 externally fixed to the section 10 adjacent to the upper end thereof. The cable 31 is adapted to be wound on and unwound from the said windlass 37 so as to extend the section 18 when said cable is wound upon this windlass and on the unwinding of the cable therefrom the said section 18 cannot rotate within the section 10 when the leg structure is in a supporting position.

The axle 38 for the windlass 37 is turned by a hand crank 39 and also has fixed thereto a ratchet gear 40 engageable by a gravity or spring detent or dog 41 pivoted at 42 exteriorly on the section 10. This dog 41 allows the windlass to be freely turned in one direction and latching it against opposite turning movement. In other words, the detent or dog 41 maintains the cable 31 wound upon the windlass 37 and against unwinding therefrom. The detent or dog 41 is released from the ratchet gear 40 when the cable 31 is to be unwound therefrom. This cable 31 trained over the pulleys 27 and 34 and having its outer end fixed with relation to the section 10 sustains the section 18 under tension and the latter functions for absorbing shocks and jars incident to the use of the leg structure through the instrumentality of the spring 30 which is seated against the shoulder 29 and yoke 26 for the pulley 27.

Threaded in the fitting 23 is a set screw 43 which locks the section 18 against displacement when the said screw binds the spline or key 22 thereof.

In Figure 4 of the drawings there is shown a modified form of clamp for association with the leg structure in substitute for the coupling collar 13 and this clamp is bolted at 44 in the sleeve 11 worn at the upper end of the section 10, as is shown in Figure 2 of the drawings and includes fixed and movable jaws 45 and 46, respectively, the movable jaw being adjustably bolted at 47 to the fixed jaw 45, these jaws being provided with serrated or biting work engaging faces 48, preferably of the formation as shown in said Figure 4 of the drawings. This form of clamp in Figure 4 of the drawings is adaptable for engaging the handle of a drilling machine so that the leg structure will support said drilling machine, not shown, to its work.

In Figures 5, 6 and 7 of the drawings there is shown a modified form of leg structure involving an outer hollowed section 49 preferably of squared formation in cross section in which slides an extensible section 50 carrying at its outer end a mounting 51 for suitable connection with work. This extensible section 50 houses therein a displaceable rack 52 which for the major extent thereof is of substantially T-shape in cross section, the remaining extent being in the form of a rounded stem 53, loosely passed through the upper end 54 of the section 50 and about this stem 53 both above and below the end 54 are coiled compression springs 55 and 56, respectively, these playing against the end 54 for the tensioning of the rack 52 having the teeth 57 which mesh with a rack gear 58 journaled in a bracket 59 externally fixed to the section 49, the later being provided with a clearance for the rack gear 58. The axle 60 of the gear 58 has attached thereto a hand crank 61 for the turning of said gear. The axle 60 carries a ratchet gear 62 engageable by a double pawl 63 pivoted at 64 in the bracket 59 and being acted upon by a compressioned spring 65. This pawl 63 in reality functions as an escapement latch for the ratchet gear 62. On the turning of the rack gear 58 the section 50 can be extended or contracted with relation to the section 49 and said section 50 is at all times maintained under tension by the springs 55 and 56 which are for shock absorbing purposes in the use of the leg structure. In Figures 8 and 9 of the drawings there is shown a modified form of the invention, wherein a clamp embraces the portion 66 corresponding with the leg 52 of Figure 6, of the leg structure which is similar to the part 49 and this clamp includes a friction latch in the form of a swinging lever 67 pivoted at 68 and this lever is provided with a gripper formed with double binding wings 69 alternately engageable for the holding of the parts of the leg structure either extended relative to each other or contracted. In this manner the leg structure can be used as a load puller or as a jack. The clamp is slidable to any desired position on the section 66 when the pressure thereof is released and in this manner allowing a wide range of adjustment. The lever 67 at the pivotal mounting 68 thereof is pivoted to outstruck hangers 70 while the said lever is bifurcated at 71 to partially accommodate a part annexed thereto of the leg structure. This clamp just described will accomplish the same results as the rack gear 58 and the pawl 63, these coacting with the rack 57 and thus allowing a shortening of the rack yet allowing a considerable extension of the leg structure. The outstruck hangers can be formed on the mounting 51 which is slidable on the section 49 and is susceptible of being adjustably held on the latter.

In Figures 10, 11, 12 and 13 of the drawings there is shown a further modification of the leg structure wherein the outer section 73 is of hollow formation and squared in cross section. This section 73 interiorly thereof forms a piston chamber 74 for a piston 75 at the uppermost end or innermost end of an extensible section 76 having the wheel fork 77 for a wheel 78 journaled therein. The piston head 75 is provided with a valved air opening 79 which allows air to pass into the chamber 74 when the section 76 is moved outwardly of the section 73. The piston head 75, when moved inwardly of the section 73, effects a dash pot or cushioning action within said section.

Interiorly of the section 73 is a cable sheave 80 which is displaceable therein and has trained thereover a cable 82, the latter being threaded through the piston head 75 and has the end 83 made fast at the outer end of the section 73, the other end of said cable being fixed at 84 to the innermost end of the section 74 and is coiled about a windlass 85 and trained over pulleys 86 and 87, respectively, these being journaled in proper position with relation to the section 73. The windlass 85 is supported in a bracket 88 exteriorly fixed to the section 73 and the winding of the cable 82 upon this windlass is such that the said cable will be let out at one side thereof and taken up at the other side intermediate of its ends 83 and 84. The section 76 has therein a sheave 81 over which is trained the cable 82. Located at opposite sides of the piston head 75 are coiled compression springs 89 and 90 respectively, the latter being seated against the sheave 81 block and the said piston head 75 while the spring 89 has seating against the sheave 80 block and the said piston head 75 and thus the section 76 will be under tension and the springs 89 and 90 will function as shock absorbers. On the turning of the windlass 85 the section 76 can be extended or contracted relative to the section 73. This leg structure as disclosed in Figures 10 to 13 inclusive of the drawings is adaptable for use in landing gear of an aircraft and such adaptation is disclosed in said Figure 10.

The windlass 85 has its axle 91 provided with flat faced ends 92 for accommodating a cranking element, not shown, for effecting the turning of said windlass at either end thereof.

The leg structure both in the preferred and modified forms can be utilized as a jack and also as an adjustable support and the preferred embodiment thereof is designed primarily for overhead use for electric or pneumatic drills or hammers, but can be used in other ways when the occasion arises.

From the foregoing description it is thought that the construction and manner of operation of the leg structure will be clearly understood and therefore a more extended explanation has been omitted.

What is claimed is:

1. A combination shock absorber and leg extension comprising an outer upper tubular section open at opposite ends, an extensible section telescopically fitting the upper section through the open lowermost end thereof, a rest shoulder formed with said extensible section, a pulley within said upper tubular section and movably supported, a yoke carrying said pulley, a stem on said yoke and slidably fitted within the extensible section with the shoulder concentric to said stem, a coiled compression spring between the yoke and the said shoulder for yieldability of the pulley relative to the extensible section, a fitting interfitted with the lowermost end of the upper section and having holding screws passed therethrough and detachably engaged in said upper section at the interfitting point of said fitting with the said upper section, a guide pulley journaled in said fitting, an adjustable cable trained over the first-named pulley and under the last-named pulley and having one end fixed to one of the holding screws, and a ratchet gear and pawl controlled windlass externally fixed on the upper section and having the other end of the cable fixed to said windlass for the winding of said cable on the said windlass or its unwinding therefrom.

2. A combination shock absorber and leg extension comprising an outer upper tubular section open at opposite ends, an extensible section telescopically fitting the upper section through the open lowermost end thereof, a rest shoulder formed with said extensible section, a pulley within said upper tubular section and movably supported, a yoke carrying said pulley, a stem on said yoke and slidably fitted within the extensible section with the shoulder concentric to said stem, a coiled compression spring between the yoke and the said shoulder for yieldability of the pulley relative to the extensible section, a fitting interfitted with the lowermost end of the upper section and having holding screws passed therethrough and detachably engaged in said upper section at the interfitting point of said fitting with the said upper section, a guide pulley journaled in said fitting, an adjustable cable trained over the first-named pulley and under the last-named pulley and having one end fixed to one of the holding screws, a ratchet gear and pawl controlled windlass externally fixed on the upper section and having the other end of the cable fixed to said windlass for the winding of said cable on the said windless or its unwinding therefrom, and a ground contacting element fitting the lowermost end of the extension section.

3. A combination shock absorber and leg extension comprising an outer upper tubular section open at opposite ends, an extensible section telescopically fitting the upper section through the open lowermost end thereof, a rest shoulder formed with said extensible section, a pulley within said upper tubular section and movably supported, a yoke carrying said pulley, a stem on said yoke and slidably fitted within the extensible section with the shoulder concentric to said stem, a coiled compression spring between the yoke and the said shoulder for yieldability of the pulley relative to the extensible section, a fitting interfitted with the lowermost end of the upper section and having holding screws passed therethrough and detachably engaged in said upper section at the interfitting point of said fitting with the said upper section, a guide pulley journaled in said fitting, an adjustable cable trained over the first-named pulley and under the last-named pulley and having one end fixed to one of the holding screws, a ratchet gear and pawl controlled windlass externally fixed on the upper section and having the other end of the cable fixed to said windlass for the winding of said cable on the said windlass or its unwinding therefrom, a ground contacting element fitting the lowermost end of the extension section, the said fitting interfitted with the lowermost end of the upper section being in snug embracing relation to the extensible section, and a reversible coupling carried at the uppermost end of the upper section.

FRED CONKLIN.